(12) United States Patent
Wheatley et al.

(10) Patent No.: US 11,915,257 B2
(45) Date of Patent: Feb. 27, 2024

(54) SYSTEMS AND METHODS FOR RECEIVING COUPON AND VENDOR DATA

(71) Applicant: Rovi Guides, Inc., San Jose, CA (US)

(72) Inventors: David J. Wheatley, Tower Lakes, IL (US); Brian C. Peterson, Barrington, IL (US); Douglas J. Seyller, Lisle, IL (US); James Cornell, Chicago, IL (US); Vanessa Wickenkamp, Elmhurst, IL (US); William J. Korbecki, Crystal Lake, IL (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/559,566

(22) Filed: Sep. 3, 2019

(65) Prior Publication Data

US 2020/0058043 A1 Feb. 20, 2020

Related U.S. Application Data

(63) Continuation of application No. 14/231,589, filed on Mar. 31, 2014, now abandoned.

(51) Int. Cl.

| | |
|---|---|
| *G06Q 30/0207* | (2023.01) |
| *G06F 3/0481* | (2022.01) |
| *H04N 21/4784* | (2011.01) |
| *H04N 21/81* | (2011.01) |

(Continued)

(52) U.S. Cl.
CPC ....... *G06Q 30/0207* (2013.01); *G06F 3/0481* (2013.01); *G06Q 30/0239* (2013.01); *H04L 12/1859* (2013.01); *H04L 12/1895* (2013.01); *H04N 21/4725* (2013.01); *H04N 21/4784* (2013.01); *H04N 21/812* (2013.01)

(58) Field of Classification Search
CPC ............... G06Q 30/0207; G06Q 30/02; G06Q 30/0239; G06F 3/0481
See application file for complete search history.

(56) References Cited

U.S. PATENT DOCUMENTS

| | | | |
|---|---|---|---|
| 2002/0078446 A1* | 6/2002 | Dakss | H04N 21/435 375/E7.008 |
| 2008/0086688 A1* | 4/2008 | Chandratillake | G06F 16/738 707/E17.028 |

(Continued)

OTHER PUBLICATIONS

Hu et al., "A Survey on Visual Content-Based Video Indexing and Retrieval" (published in IEEE Transactions on Systems, Man, and Cybernetics—Part C: Applications and Reviews, vol. 31, No. 6, Nov. 2011 (Year: 2011).*

*Primary Examiner* — James M Detweiler
*Assistant Examiner* — Patrick Kim
(74) *Attorney, Agent, or Firm* — Haley Guiliano LLP

(57) ABSTRACT

Systems and methods for receiving product data for products featured in a media asset are described. In some embodiments, the system includes control circuitry that receives from a server data for a plurality of products featured in a media asset. The control circuitry generates for display a list including the plurality of products. The control circuitry determines whether a product in the list is associated with a coupon and/or a preferred vendor. The control circuitry visually distinguishes the product from other products in the list in response to determining that the product is associated with a coupon and/or a preferred vendor.

20 Claims, 8 Drawing Sheets

(51) Int. Cl.
*H04N 21/4725* (2011.01)
*H04L 12/18* (2006.01)

(56) References Cited

U.S. PATENT DOCUMENTS

| | | | | |
|---|---|---|---|---|
| 2012/0206647 | A1* | 8/2012 | Allsbrook | H04N 21/434 |
| | | | | 348/E5.009 |
| 2013/0085807 | A1* | 4/2013 | Cincotta | G06Q 30/0203 |
| | | | | 705/7.32 |
| 2013/0166382 | A1* | 6/2013 | Cassidy | H04N 21/25875 |
| | | | | 705/14.55 |
| 2015/0121221 | A1* | 4/2015 | Wellen | H04N 21/435 |
| | | | | 715/716 |
| 2015/0262278 | A1* | 9/2015 | Lin-Hendel | G06Q 30/0633 |
| | | | | 705/26.62 |

\* cited by examiner

800

802 — <Media Asset>
804 — <Title> The Bourne Identity </Title>
806 — <Runtime> 119 Minutes </Runtime>
808 — <Product Data>
810 — <Category> Electronic </Category>
812 — <Product> Apple Iphone </Product>
814 — <Timestamp> 45 Minutes, 15 Seconds </Timestamp>
816 — <Buylink> http://amazon.com/Iphone </Buylink>
818 — </Product Data>
820 — <Product Data>
822 — <Category> Automotive </Category>
824 — <Product> Hyundai Sonata </Product>
826 — <Timestamp> 54 Minutes, 04 Seconds </Timestamp>
828 — <Buylink> http://cars.com/Sonata </Buylink>
830 — </Product Data>
832 — </Media Asset>

FIG. 8

SYSTEMS AND METHODS FOR RECEIVING COUPON AND VENDOR DATA

CROSS-REFERENCE TO RELATED APPLICATIONS

This application is a continuation of U.S. patent application Ser. No. 14/231,589, filed Mar. 31, 2014. The disclosure of which is hereby incorporated by reference herein in its entirety.

BACKGROUND

Product placement is a form of advertising in media content, such as movies and television programs, in which the advertiser of a product pays to have the product featured in the media content. If a user viewing the media content likes the product appearing in the media content, the user may be interested in receiving more information or in purchasing the product. However, unless the brand and/or model of the product appearing in the media content is obvious to detect, it would be difficult for the user to retrieve further information or to be sure that he is purchasing the same product or a related product that is appearing in the media content being viewed.

SUMMARY OF THE DISCLOSURE

Systems and methods for receiving product data for products featured in a media asset are described. A user equipment device may be equipped with control circuitry to receive and process product data for products featured in the media asset. For example, the user equipment device may receive a television program and data about the products featured in the television program and timestamps for when the products are featured in the television program. The data about the featured products may include product information, a category, a price, a vendor, a coupon, or any other suitable information for aiding an interested user in receiving more information or in purchasing one or more of the featured products. The featured products may be tangible or intangible in nature. In some embodiments, the media asset includes a plot segment and an advertisement segment, where products are featured in the plot segment of the media asset.

In some embodiments, the user equipment device includes control circuitry to execute an interactive media guidance application. The interactive media guidance application may provide an interface that allows users to navigate media assets and identify a media asset that they wish to view. The interface may additionally include an icon for each media asset that features products in the form of product placement or other suitable advertisements.

In some embodiments, the control circuitry is configured to present an option for the user to opt in or opt out of receiving information regarding featured products when the user selects a media asset for display. For example, when a user selects a television program to view, the control circuitry may generate an interstitial screen at the beginning of the television program which informs the user that certain products and/or related products in the television program may be purchased. The interstitial screen may present an option to opt in for receiving information regarding products featured in the television program. The user may optionally trigger the option to opt in or opt out via a dedicated or programmed button on a remote control or a gesture made using a touch screen for the user equipment device.

In some embodiments, the control circuitry is configured to generate options for categories of products featured in the media asset. For example, when a user selects a television program to view, the control circuitry may generate an interstitial screen at the beginning of the television program which informs the user that certain products in the television program may be purchased and an option to opt in for receiving information regarding products featured in the television program. The interstitial screen may present categories of products featured in the television program. The user may select one or more categories of products he is interested in having highlighted during the television program.

In some embodiments, the control circuitry receives from a server data for products featured in the media asset and timestamps for the media asset. Each timestamp is associated with one of the products featured in the media asset. The control circuitry selects one or more products and timestamps associated with the products. In some embodiments, the control circuitry may select all products featured in the plot segment of the media asset.

In some embodiments, the control circuitry may select products from a portion of the media asset not yet viewed by the user. The control circuitry may retrieve from a memory a viewing history for the user. The control circuitry may identify a portion of the media asset that is not viewed by the user based on the viewing history. For example, the user may have stopped a one-hour television program after viewing the first 30 minutes and not viewed the last 30 minutes of the television program. In some embodiments, the portion of the media asset includes a portion of the plot segment of the media asset and does not include any portion of the advertisement segment of the media asset. The control circuitry may determine a timestamp related to the portion of the media asset not viewed by the user and identify a product associated with the timestamp.

In some embodiments, the control circuitry may select products from a portion of the media asset that has been previously viewed by the user. The control circuitry may retrieve from a memory a viewing history for the user. The control circuitry may identify a portion of the media asset that has been viewed by the user based on the viewing history. For example, the user may have stopped a one-hour television program after viewing the first 30 minutes and not viewed the last 30 minutes of the television program. In some embodiments, the portion of the media asset includes a portion of the plot segment of the media asset and does not include any portion of the advertisement segment of the media asset. The control circuitry may determine a timestamp related to the portion of the media asset viewed by the user and identify a product associated with the timestamp.

In some embodiments, the user may select a product from the list to express interest and receive subsequent advertisements and/or information for products featured in the media asset related to the product of interest to the user. For example, the user may select the APPLE IPHONE product from the list. The user may receive subsequent advertisements and/or information for APPLE IPHONE products featured in the media asset. For example, the user may select the APPLE IPHONE product from the list. The control circuitry may determine products related to APPLE IPHONE including all APPLE branded products. The user may receive subsequent advertisements and/or information for APPLE branded products featured in the media asset.

The control circuitry may generate for display a list including the selected products. For example, the media asset may feature products including APPLE IPHONE electronics and HYUNDAI SONATA automobiles. In some embodiments, the control circuitry receives a user selection of a product from the list and generates for display a portion of the media asset featuring the selected product. The control circuitry may retrieve the portion of the media asset featuring the selected product based on the timestamp associated with the product. In some embodiments, the control circuitry generates for display a video clip or an image for each product in the list. In some embodiments, the control circuitry arranges the video clip or the image for each product in the list in a mosaic display. The video clip or the image includes a scene from the media asset featuring the product. In response to receiving a selection of the video clip or the image, the control circuitry generates for display the video clip or the image featuring the selected product. The video clip or the image may be associated with the timestamp for the product. In some embodiments, the control circuitry generates for display an indicator, such as a link, a button, or any suitable indicator, for each product in the list. The indicator allows the user to view the product in context within the media asset. For example, in response to selecting the indicator, the control circuitry may retrieve and generate for display the media asset beginning at a point where the product is featured in the media asset.

In some embodiments, the control circuitry generates for display an option for the user to purchase the product. In response to receiving a user selection of the option, the control circuitry generates for display product information, a price, a vendor, a coupon, or any other suitable information for the product. Optionally, the control circuitry may transmit an instruction to the server to add the selected product to a wishlist for the user in response to receiving the selection of the option. The control circuitry may select the vendor based on user preferences entered by the user or determined based on the user's past activity. For example, the control circuitry may select the AMAZON PRIME website as the vendor because the user has made his past purchases from that website. Optionally, the control circuitry may substitute the product information for the product with an alternate or similar product based on user preferences. For example, the control circuitry may substitute TIFFANY products featured in the media asset with similar but less expensive products from WALMART because the user has made his past purchases from that vendor.

In some embodiments, in response to receiving a user selection of the option to purchase the product, the control circuitry generates for display information including a list of vendors and respective prices for the product. The user may utilize this information to comparison shop or to confirm that their preferred vendor, if designated, is offering the product for an acceptable price. The control circuitry may generate for display the user's preferred vendor to be first in the list. The control circuitry may generate for display an icon to visually distinguish the user's preferred vendor from other vendors in the list.

In some embodiments, the control circuitry generates for display an option for a user to add the product to a wishlist for the user. The wishlist may include products the user would like to receive as gifts from others or would like to purchase himself at a later time. The wishlist may be stored locally at a user equipment device or at a server, e.g., a server for an online retailer such as AMAZON. In response to receiving a user selection of the option, the control circuitry transmits to the server an instruction to add the product to the wishlist of the user. In some embodiments, the user may use a gesture to trigger the control circuitry to transmit an instruction to the server to add the selected product to a wishlist for the user. For example, the user may slide his finger in a particular pattern on a touch screen to trigger the action. In another example, the user may press a button on a remote control to trigger the action. The gesture may be independent of the type of media asset, e.g., audio, video, or other suitable type of media asset, in which the trigger is generated.

In some embodiments, the control circuitry generates for display an advertisement featuring a product that may be purchased by the user. In response to receiving user input to purchase the product, the control circuitry may generate for display at least one of product information, a price, and a vendor for the product featured in the advertisement. The user input may be user pressing a button on a remote control, making a gesture on a touch screen, or any other suitable user input. The user may be required to view the advertisement before triggering the action to purchase the product. The product featured in the advertisement may be featured in or related to a media asset that is displayed subsequent to the advertisement. Alternatively, the product featured in the advertisement may be selected based on user preferences.

In some embodiments, the control circuitry generates for display a coupon for a product, such as a product featured in a media asset. The control circuitry may receive the coupon from a vendor that offers the product for purchase. Alternatively, the control circuitry may receive the coupon from an account associated with the user. For example, the control circuitry may receive the coupon from a t-commerce account for the user. The user may send the coupon from their e-mail account to the t-commerce account. Alternatively, the user may direct a vendor to send the coupon directly to the user's t-commerce account. In some embodiments, the control circuitry automatically retrieves a coupon for a particular vendor from the user's t-commerce account and applies the coupon to the purchase price of a product offered by the vendor. This may allow the user to avoid the hassle of searching for the coupon and applying it when purchasing the product from the vendor.

In some embodiments, the control circuitry generates for display product information in response to user input to purchase the product. The control circuitry may automatically retrieve the product information including reviews for the product and any other related research to aid the user in making the decision to purchase the product. For example, the control circuitry may retrieve reviews from vendor websites for the product. This may allow the user to avoid the effort of searching for product reviews while making the decision to purchase the product.

In some aspects, the systems and methods described herein provide for a system for receiving product data. The system includes user input circuitry and control circuitry. The control circuitry receives from a server data for a plurality of products featured in a media asset and a plurality of timestamps for the media asset. Each timestamp is associated with one of the plurality of products featured in the media asset. The control circuitry generates for display a list including one or more products of the plurality of products. The control circuitry receives from the user input circuitry a selection of a product in the list. The control circuitry transmits to the server a request for a portion of the media asset featuring the selected product based on a timestamp associated with the selected product.

In some embodiments, the control circuitry retrieves from a memory a viewing history for a user. The control circuitry identifies a portion of the media asset that is not viewed by the user based on the viewing history. The control circuitry determines a timestamp of the plurality of timestamps related to the portion of the media asset not viewed by the user. The control circuitry identifies a product of the plurality of products associated with the timestamp.

In some embodiments, the control circuitry retrieves from a memory a viewing history for a user. The control circuitry identifies a portion of the media asset that has been viewed by the user based on the viewing history. The control circuitry determines a timestamp of the plurality of timestamps related to the portion of the media asset viewed by the user. The control circuitry identifies a product of the plurality of products associated with the timestamp.

In some embodiments, the data for the plurality of products featured in the media asset includes at least one of product information, a category, a price, and a vendor for each product of the plurality of products. In some embodiments, the control circuitry receives a category from the user input circuitry. The control circuitry determines a product of the plurality of products associated with the category.

In some embodiments, the control circuitry generates for display an option for a user to purchase the product. The control circuitry receives via the user input circuitry a selection of the option. The control circuitry generates for display at least one of product information, a price, and a vendor for the product. In some embodiments, the control circuitry transmits an instruction to the server to add the product to a wishlist for a user in response to receiving the selection of the option.

In some embodiments, the control circuitry generates for display an option for a user to add the product to a wishlist for the user. The control circuitry receives via the user input circuitry a selection of the option. The control circuitry transmits to the server an instruction to add the product to the wishlist of the user.

In some embodiments, the control circuitry generates for display an option for a user to opt out of receiving product data. The control circuitry receives via the user input circuitry a selection of the option. The control circuitry prevents display of the list including one or more products of the plurality of products in response to receiving the selection of the option.

In some embodiments, the control circuitry generates for display a video clip or an image for each product in the list. The video clip or the image includes a scene from the media asset featuring the product.

In some aspects, the systems and methods described herein provide for a system for receiving product data. The system includes control circuitry. The control circuitry receives from a server data for a plurality of products featured in a media asset. The control circuitry generates for display a list including the plurality of products. The control circuitry determines whether a product in the list is associated with at least one of a coupon and a preferred vendor. The control circuitry visually distinguishes the product from other products in the list in response to determining that the product is associated with at least one of a coupon and a preferred vendor.

In some embodiments, the control circuitry retrieves from a memory a profile for a user. The control circuitry determines that the profile includes the at least one of the coupon and the preferred vendor. The control circuitry further determines that the at least one of the coupon and the preferred vendor included in the profile is associated with the product.

In some embodiments, the coupon is received from a vendor offering the product for purchase. In some embodiments, the coupon is received from one of an e-mail account, a t-commerce account, and a social media account for a user. In some embodiments, the coupon is received at an e-mail account for a user from a vendor offering the product for purchase and transferred to a t-commerce account for the user.

In some embodiments, the control circuitry generates for display an icon for the product in the list associated with at least one of a coupon and a preferred vendor. In some embodiments, the control circuitry generates for display a highlight for the product in the list associated with at least one of a coupon and a preferred vendor. In some embodiments, the control circuitry generates for display the list including the product associated with at least one of a coupon and a preferred vendor in a color different from one or more colors for the other products in the list. In some embodiments, the control circuitry generates for display the list including the product associated with at least one of a coupon and a preferred vendor above the other products in the list.

In some embodiments, the control circuitry generates for display a video clip or an image for each product in the list. The video clip or the image includes a scene from the media asset featuring the product.

In some aspects, the systems and methods described herein include a method, an apparatus, or non-transitory machine-readable media for managing storage space of media assets stored on a storage device configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 is an illustrative embodiment of product data associated with a media asset in accordance with some embodiments of the disclosure;

DETAILED DESCRIPTION

Systems and methods for receiving product data for products featured in a media asset are described. A user equipment device (e.g., user equipment device 300 in FIG. 3) may be equipped with control circuitry (e.g., control circuitry 304 in FIG. 3) to receive and process product data for products featured in the media asset. For example, the user equipment device may receive television program and data about the products featured in the television program and timestamps for when the products are featured in the television program. The user equipment device may receive the data from product data source 424. The data about the featured products may include product information, a category, a price, a vendor, a coupon, or any other suitable information for aiding an interested user in receiving more information or in purchasing one or more of the featured products. The featured products may be tangible or intangible in nature. In some embodiments, the media asset includes a plot segment and an advertisement segment, where products are featured in the plot segment of the media asset. FIG. 8 is an illustrative embodiment of product data in accordance with some embodiments of the disclosure.

Figure 1:
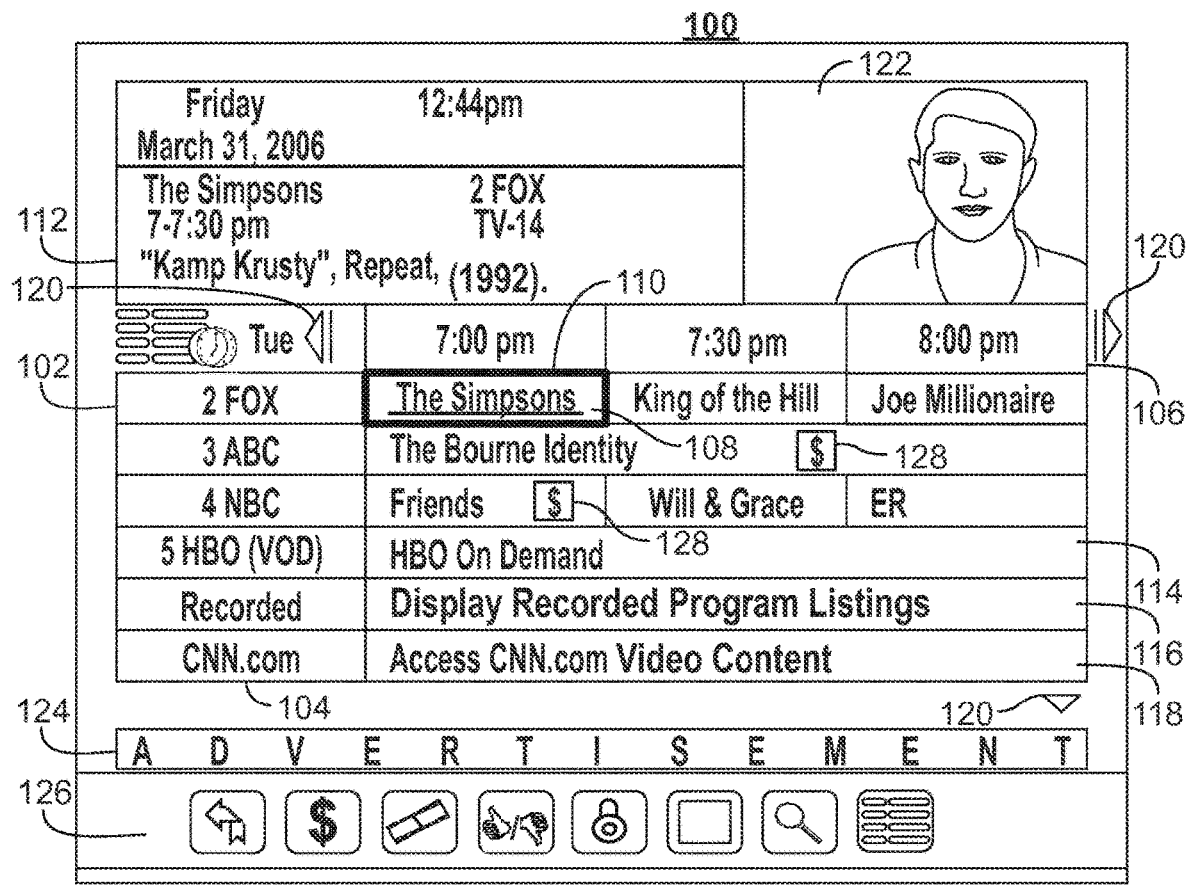
FIGS. 1 and 2 show illustrative display screens that may be used to provide media guidance application listings in accordance with some embodiments of the disclosure.
Figure 2:
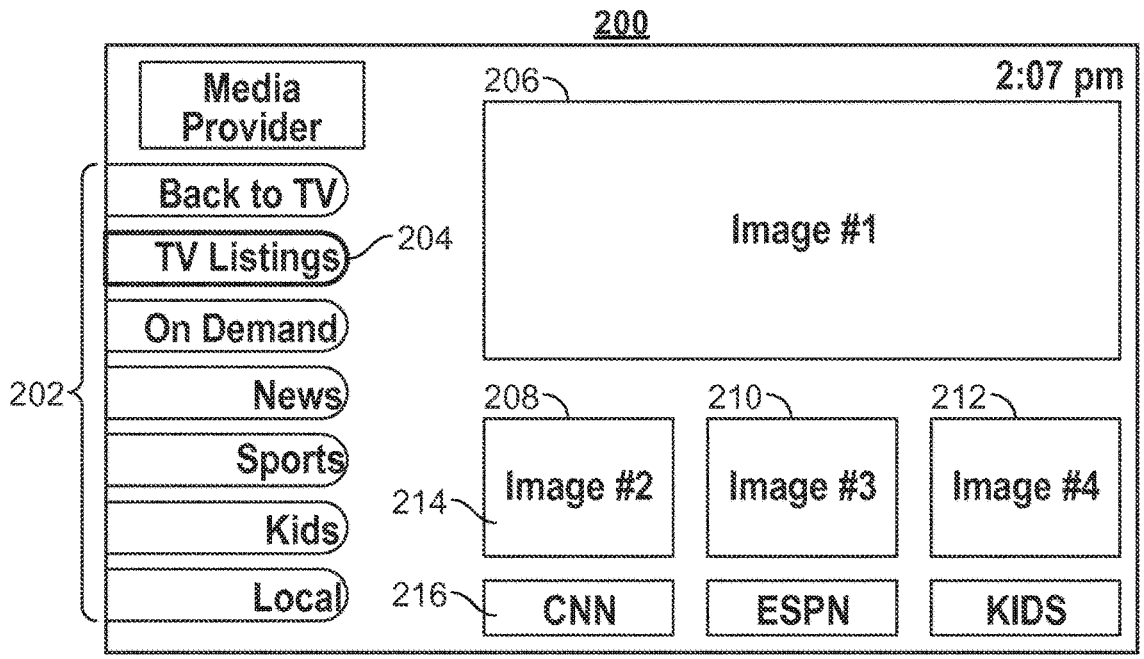

In some embodiments, the user equipment device includes control circuitry to execute an interactive media guidance application. The interactive media guidance application may provide an interface that allows users to navigate media assets and identify a media asset that they wish to view. FIGS. 1 and 2 show illustrative display screens that may be used to provide media guidance application listings in accordance with some embodiments of the disclosure. The interface may additionally include an icon for each media asset that features products in the form of product placement or other suitable advertisements.

Figure 5:
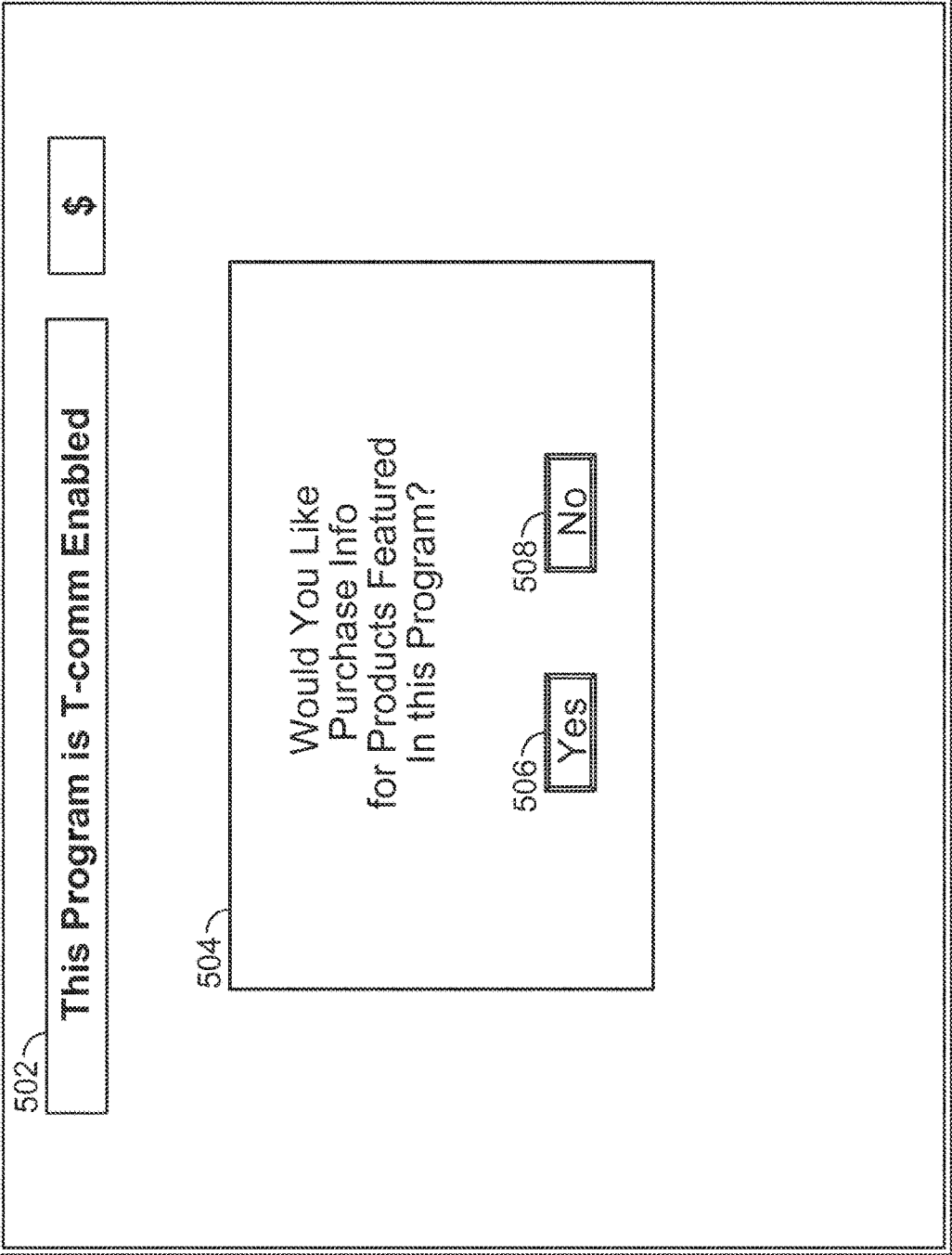
FIG. 5 is an illustrative display screen for receiving product data in accordance with some embodiments of the disclosure.

In some embodiments, the control circuitry is configured to present an option for the user to opt in or opt out of receiving information regarding featured products when the user selects a media asset for display. FIG. 5 is an illustrative display screen for such an option in accordance with some embodiments of the disclosure. For example, when a user selects a television program to view, the control circuitry may generate an interstitial screen at the beginning of the television program which informs the user that certain products and/or related products in the television program may be purchased. The interstitial screen may present an option to opt in for receiving information regarding products featured in the television program. The user may optionally trigger the option to opt in or opt out via a dedicated or programmed button on a remote control or a gesture made using a touch screen for the user equipment device.

Figure 6:
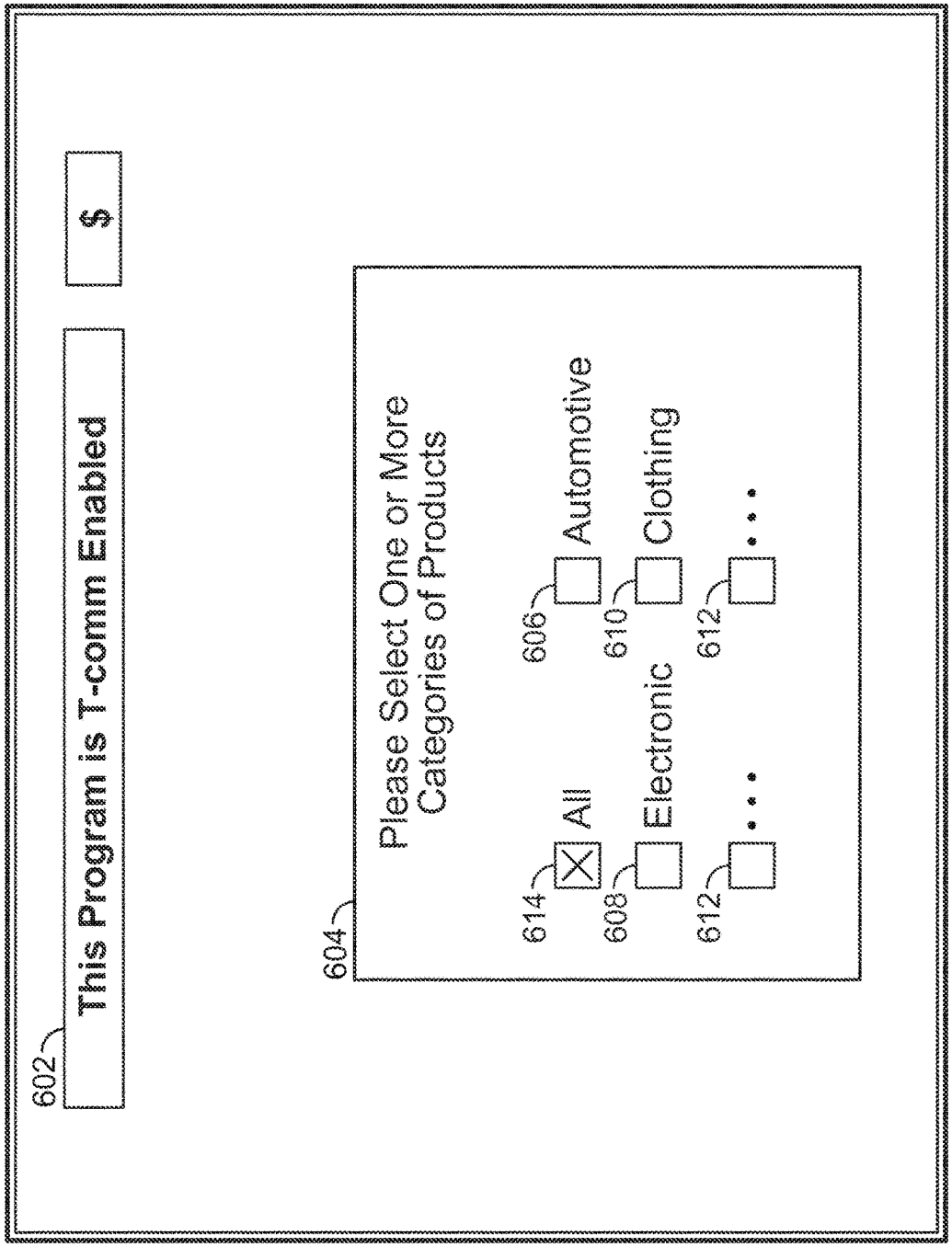
FIG. 6 is another illustrative display screen for receiving product data in accordance with some embodiments of the disclosure.

In some embodiments, the control circuitry is configured to generate options for categories of products featured in the media asset. For example, when a user selects a television program to view, the control circuitry may generate an interstitial screen at the beginning of the television program which informs the user that certain products in the television program may be purchased and an option to opt in for receiving information regarding products featured in the television program. The interstitial screen may present categories of products featured in the television program. The user may select one or more categories of products he is interested in having highlighted during the television program. FIG. 6 is an illustrative display screen for selecting categories in accordance with some embodiments of the disclosure.

In some embodiments, the control circuitry receives from a server data for products featured in the media asset and timestamps for the media asset. Each timestamp is associated with one of the products featured in the media asset. The control circuitry selects one or more products and timestamps associated with the products. In some embodiments, the control circuitry may select all products featured in the plot segment of the media asset.

In some embodiments, the control circuitry may select products from a portion of the media asset not yet viewed by the user. The control circuitry may retrieve from a memory, e.g., storage 308 in FIG. 3, a viewing history for the user. The control circuitry may identify a portion of the media asset that is not viewed by the user based on the viewing history. For example, the user may have stopped a one-hour television program after viewing the first 30 minutes and not viewed the last 30 minutes of the television program. In some embodiments, the portion of the media asset includes a portion of the plot segment of the media asset and does not include any portion of the advertisement segment of the media asset. The control circuitry may determine a timestamp related to the portion of the media asset not viewed by the user and identify a product associated with the timestamp.

In some embodiments, the control circuitry may select products from a portion of the media asset that has been previously viewed by the user. The control circuitry may retrieve from a memory, e.g., storage 308 in FIG. 3, a viewing history for the user. The control circuitry may identify a portion of the media asset that has been viewed by the user based on the viewing history. For example, the user may have stopped a one-hour television program after viewing the first 30 minutes and not viewed the last 30 minutes of the television program. In some embodiments, the portion of the media asset includes a portion of the plot segment of the media asset and does not include any portion of the advertisement segment of the media asset. The control circuitry may determine a timestamp related to the portion of the media asset viewed by the user and identify a product associated with the timestamp.

In some embodiments, the user may select a product from the list to express interest and receive subsequent advertisements and/or information for products featured in the media asset related to the product of interest to the user. For example, the user may select the APPLE IPHONE product from the list. The user may receive subsequent advertisements and/or information for APPLE IPHONE products featured in the media asset. For example, the user may select the APPLE IPHONE product from the list. The control circuitry may determine products related to APPLE IPHONE including all APPLE branded products. The user may receive subsequent advertisements and/or information for APPLE branded products featured in the media asset.

The control circuitry may generate for display a list including the selected products. For example, the media asset may feature products including APPLE IPHONE electronics and HYUNDAI SONATA automobiles. FIG. 8 is an illustrative display screen showing such a display in accordance with some embodiments of the disclosure. In some embodiments, the control circuitry receives a user selection of a product from the list and generates for display a portion of the media asset featuring the selected product. The control circuitry may retrieve the portion of the media asset featuring the selected product based on the timestamp associated with the product. In some embodiments, the control circuitry generates for display a video clip or an image for each product in the list. In some embodiments, the control circuitry arranges the video clip or the image for each product in the list in a mosaic display. The video clip or the image includes a scene from the media asset featuring the product. In response to receiving a selection of the video clip or the image, the control circuitry generates for display the video clip or the image featuring the selected product. The video clip or the image may be associated with the timestamp for the product. In some embodiments, the control circuitry generates for display an indicator, such as a link, a button, or any suitable indicator, for each product in the list. The indicator allows the user to view the product in context within the media asset. For example, in response to selecting the indicator, the control circuitry may retrieve and generate for display the media asset beginning at a point where the product is featured in the media asset.

In some embodiments, the control circuitry generates for display an option for the user to purchase the product. FIG. 8 is an illustrative display screen showing such a display in accordance with some embodiments of the disclosure. In response to receiving a user selection of the option, the control circuitry generates for display product information, a price, a vendor, a coupon, or any other suitable information for the product. Optionally, the control circuitry may transmit an instruction to the server to add the selected product to a wishlist for the user in response to receiving the selection of the option. The control circuitry may select the vendor based on user preferences entered by the user or determined based on the user's past activity. For example, the control circuitry may select the AMAZON PRIME website as the vendor because the user has made his past purchases from that website. Optionally, the control circuitry may substitute the product information for the product with an alternate or similar product based on user preferences. For example, the control circuitry may substitute TIFFANY products featured in the media asset with similar but less expensive products from WALMART because the user has made his past purchases from that vendor.

In some embodiments, in response to receiving a user selection of the option to purchase the product, the control circuitry generates for display information including a list of vendors and respective prices for the product. The user may utilize this information to comparison shop or to confirm that their preferred vendor, if designated, is offering the product for an acceptable price. The control circuitry may generate for display the user's preferred vendor to be first in the list. The control circuitry may generate for display an icon to visually distinguish the user's preferred vendor from other vendors in the list.

Figure 7:
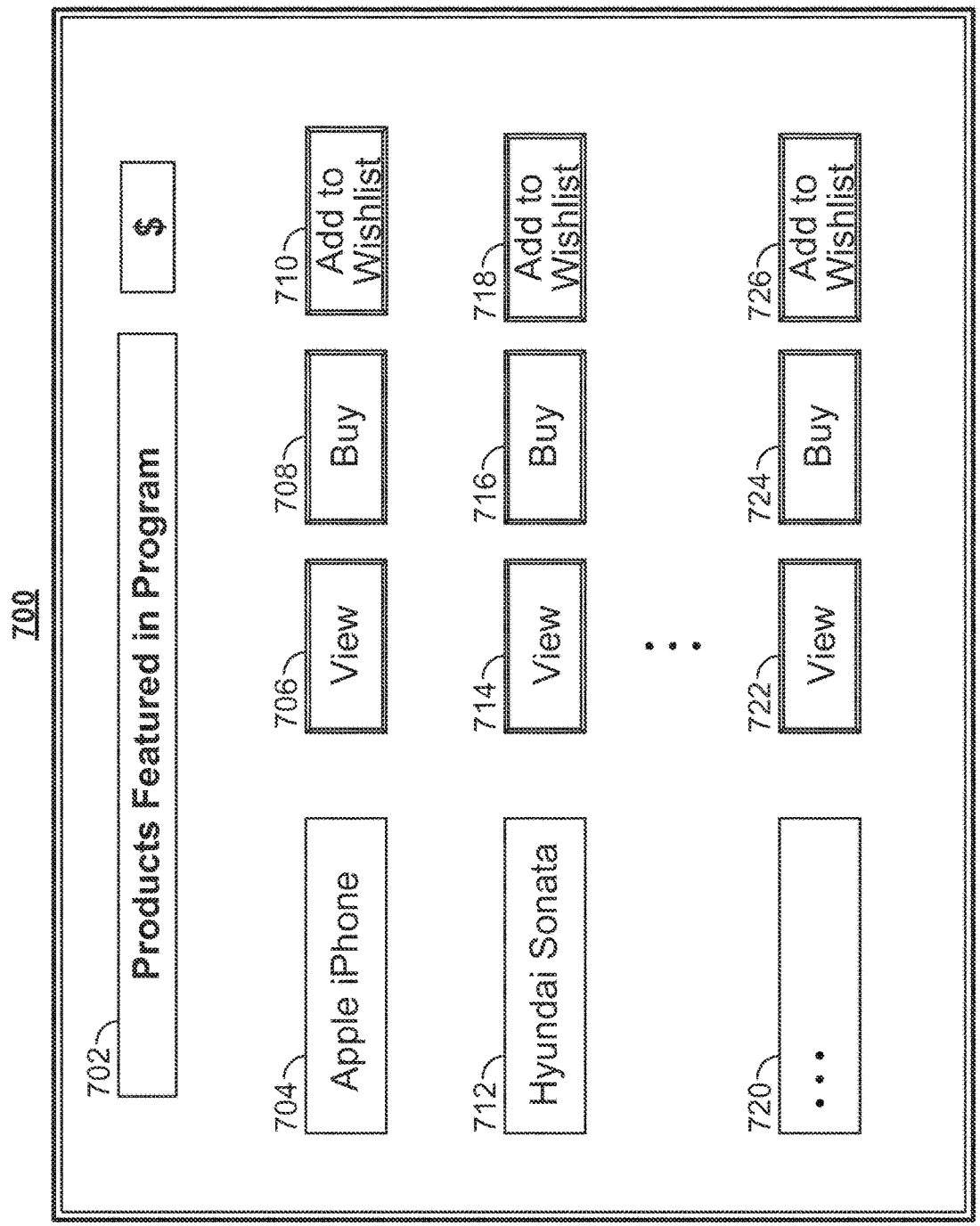
FIG. 7 is yet another illustrative display screen for receiving product data in accordance with some embodiments of the disclosure.

In some embodiments, the control circuitry generates for display an option for a user to add the product to a wishlist for the user. FIG. 7 is an illustrative display screen showing such a display in accordance with some embodiments of the disclosure. The wishlist may include products the user would like to receive as gifts from others or would like to purchase himself at a later time. The wishlist may be stored locally at a user equipment device, e.g., user equipment device 300 in FIG. 3, or at a server, e.g., a server for an online retailer such as AMAZON. In response to receiving a user selection of the option, the control circuitry transmits to the server an instruction to add the product to the wishlist of the user. In some embodiments, the user may use a gesture to trigger the control circuitry to transmit an instruction to the server to add the selected product to a wishlist for the user. For example, the user may slide his finger in a particular pattern on a touch screen to trigger the action. In another example, the user may press a button on a remote control to trigger the action. The gesture may be independent of the type of media asset, e.g., audio, video, or other suitable type of media asset, in which the trigger is generated.

In some embodiments, the control circuitry generates for display an advertisement featuring a product that may be purchased by the user. In response to receiving user input to purchase the product, the control circuitry may generate for display at least one of product information, a price, and a vendor for the product featured in the advertisement. The user input may be user pressing a button on a remote control, making a gesture on a touch screen, or any other suitable user input. The user may be required to view the advertisement before triggering the action to purchase the product. The product featured in the advertisement may be featured in or related to a media asset that is displayed subsequent to the advertisement. Alternatively, the product featured in the advertisement may be selected based on user preferences.

In some embodiments, the control circuitry generates for display a coupon for a product, such as a product featured in a media asset. The control circuitry may receive the coupon from a vendor that offers the product for purchase. Alternatively, the control circuitry may receive the coupon from an account associated with the user. For example, the control circuitry may receive the coupon from a t-commerce account for the user. The user may send the coupon from their e-mail account to the t-commerce account. Alternatively, the user may direct a vendor to send the coupon directly to the user's t-commerce account. In some embodiments, the control circuitry automatically retrieves a coupon for a particular vendor from the user's t-commerce account and applies the coupon to the purchase price of a product offered by the vendor. This may allow the user to avoid the hassle of searching for the coupon and applying it when purchasing the product from the vendor.

In some embodiments, the control circuitry generates for display product information in response to user input to purchase the product. The control circuitry may automatically retrieve the product information including reviews for the product and any other related research to aid the user in making the decision to purchase the product. For example, the control circuitry may retrieve reviews from vendor websites for the product. This may allow the user to avoid the effort of searching for product reviews while making the decision to purchase the product.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. Grid 102 may optionally include icon 128 for each program that features products in the form of product placement or other suitable advertisements. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
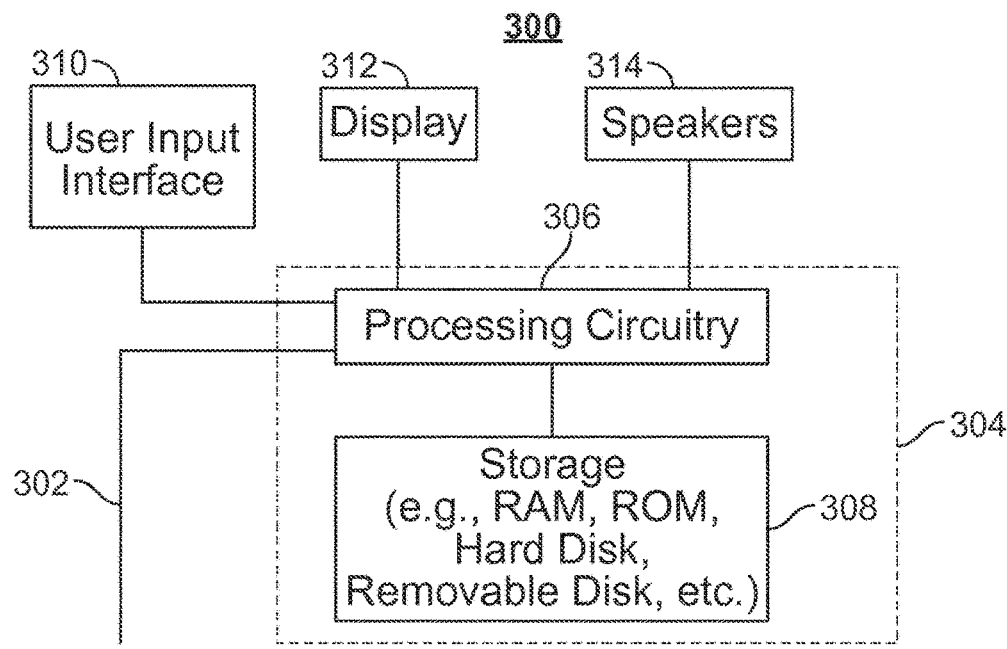
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
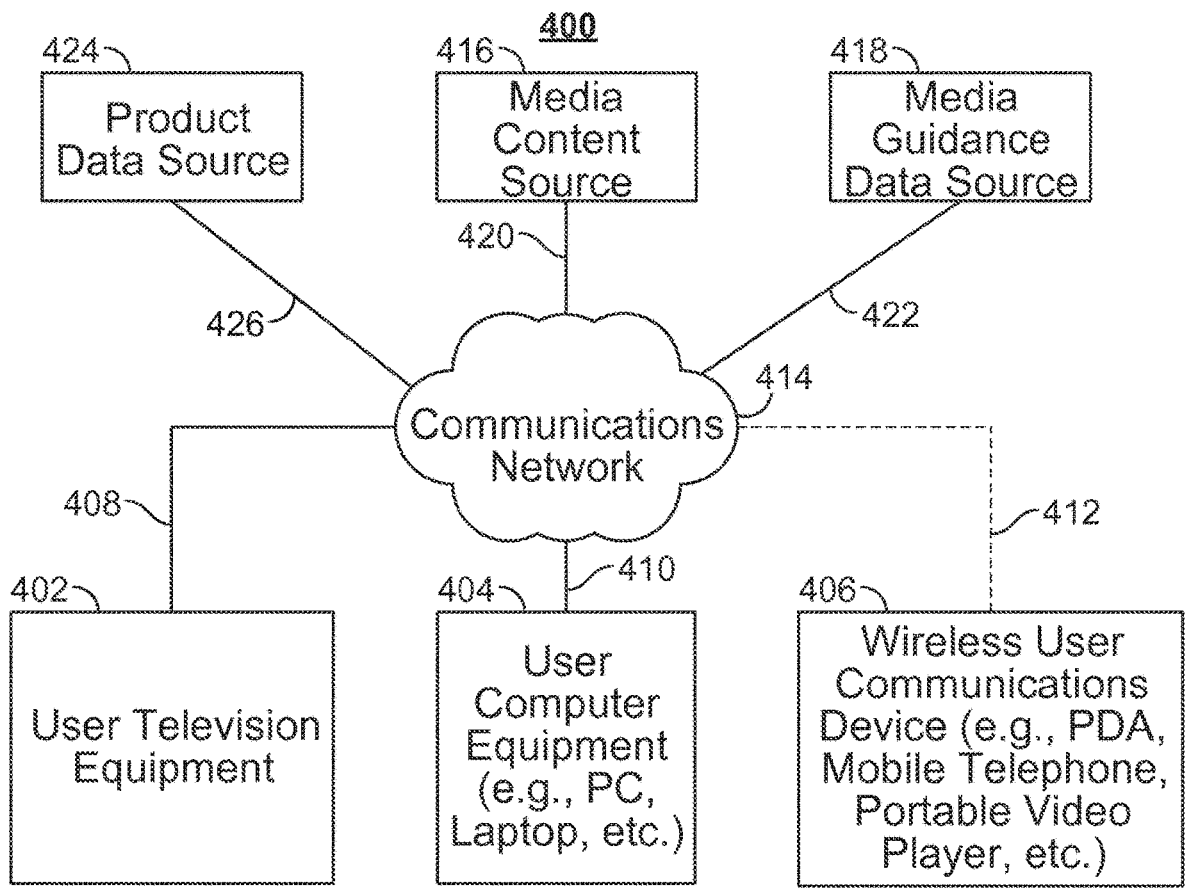
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and product data source 424 coupled to communications network 414 via communication paths 420, 422, and 426, respectively. Paths 420, 422, and 426 may include any of the communication paths described above in connection with paths 408, 410, and 412. Communications with the content source 416, media guidance data source 418, and product data source 424 may be exchanged over one or more communications paths, but are shown as a single path in FIG. 4 to avoid overcomplicating the drawing. In addition, there may be more than one of each of content source 416, media guidance data source 418, and product data source 424, but only one of each is shown in FIG. 4 to avoid overcomplicating the drawing. (The different types of each of these sources are discussed below.) If desired, content source 416, media guidance data source 418, and product data source 424 may be integrated as one source device. Although communications between sources 416, 418, and 424 with user equipment devices 402, 404, and 406 are shown as through communications network 414, in some embodiments, sources 416, 418, and 424 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Product data source 424 may provide data about products featured in a media asset and timestamps for when the products are featured in the media asset. The data about the featured products may include product information, a category, a price, a vendor, a coupon, or any other suitable information for aiding an interested user in receiving more information or in purchasing one or more of the featured products. The product data may be provided to the user equipment devices using any suitable approach as described with respect source 416 and 418 above.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is an illustrative display screen for receiving product data in accordance with some embodiments of the disclosure. Display screen 500, including sections 502 and 504, may be generated when a user selects a media asset to view from display 100 or responsive to the user pressing a dedicated or programmed button on a remote control for user equipment device 300. For example, when a user selects a television program to view from display 100, control circuitry 304 may generate display screen 500 at the beginning of the television program. Section 502 informs the user that the selected program is t-commerce (television-commerce) enabled, i.e., certain products featured in the television program may be purchased via the television itself. Section 504 queries the user regarding whether he would like purchase information for products featured in the program. Section 504 includes options 506 and 508. If the user selects option 506, he opts in for receiving information regarding products featured in the television program. If the user selects option 508, he opts out of receiving information regarding products featured in the television program.

FIG. 6 is another illustrative display screen for receiving product data in accordance with some embodiments of the disclosure. Continuing from the example described with reference to FIG. 5, display screen 600, including sections 602 and 604, may be generated subsequent to selection of option 506 in display 500. Section 602 informs the user that the selected program is t-commerce (television-commerce) enabled, i.e., certain products featured in the television program may be purchased via the television itself. Section 604 presents options 606-614 for categories of products featured in the television program. For example, section 604 may include "automotive" category option 606, "electronic" category option 608, "clothing" category option 610, and other suitable category options 612 for products featured in the television program. The user may select one or more categories of products he is interested in having highlighted during the television program. In this example, the user may select "all" categories option 614 indicating that he is interested in receiving product information for all categories of products featured in the television program.

FIG. 7 is yet another illustrative display screen for receiving product data in accordance with some embodiments of the disclosure. Display 700 may be generated before the playback of a media asset, during the playback of the media asset, or after the playback of the media asset is complete. Like display screens 500 and 600, display screen 700 includes section 702 to inform the user that the selected program is t-commerce (television-commerce) enabled, i.e., certain products featured in the television program may be purchased via the television itself. Control circuitry 304 may receive from a server data for products featured in the media asset and timestamps for the media asset. Control circuitry 304 may select one or more of the products featured in the media asset and timestamps associated with the products. Display screen 700 includes a list of the products selected by control circuitry 304. Each of products 704 ("APPLE IPHONE"), 712 ("HYUNDAI SONATA"), and 720 include corresponding options 706, 714, and 722 to view a video clip or an image where the product is featured in the media asset, options 708, 716, and 724 to purchase the product featured in the media asset, and options 710, 718, and 726 to add the product featured in the media asset to a wishlist for the user. Control circuitry 304 may receive a user selection of option 706, 714, or 722 and generate for display a portion of the media asset featuring the selected product. Control circuitry 304 may retrieve the portion of the media asset featuring the selected product based on the timestamp associated with the product.

Control circuitry 304 may receive a user selection of option 708, 716, or 724 and generate for display product information, a price, a vendor, a coupon, or any other suitable information for the product. Control circuitry 304 may select the vendor based on user preferences entered by the user or determined based on the user's past activity. For example, control circuitry 304 may select the AMAZON PRIME website as the vendor because the user has made his past purchases from that website. Optionally, control circuitry 304 may substitute the product information for the product with an alternate or similar product based on user preferences. For example, control circuitry 304 may substitute TIFFANY products featured in the media asset with similar but less expensive products from WALMART because the user has made his past purchases from that vendor.

Control circuitry 304 may receive a user selection of option 710, 718, or 726 and generate for display an option for a user to add the product to a wishlist for the user. In response to receiving a user selection of the option, control circuitry 304 may transmit to the server an instruction to add the product to the wishlist of the user. In some embodiments, the user may use a gesture to trigger control circuitry 304 to transmit an instruction to the server to add the selected product to a wishlist for the user. For example, the user may slide his finger in a particular pattern on a touch screen to trigger the action. In another example, the user may press a button on a remote control to trigger the action. The gesture may be independent of the type of media asset, e.g., audio, video, or other suitable type of media asset, in which the trigger is generated.

These options are illustrative and display screen 700 may present one or all of these options and/or any other suitable options related to products featured in the media asset. For example, display screen 700 may include a video clip or an image for each product in the list that includes a scene from the media asset featuring the product. In response to receiving a selection of the video clip or the image, control circuitry 304 may generate for display the video clip or the image featuring the selected product. The video clip or the image may be associated with the timestamp for the product. In another example, control circuitry 304 may receive a user selection of product 704, 712, or 720 and generate for display a portion of the media asset featuring the selected product. Control circuitry 304 may retrieve the portion of the media asset featuring the selected product based on the timestamp associated with the product.

In some embodiments, control circuitry 304 generates for display a coupon for a product, such as a product featured in a media asset. Control circuitry 304 may receive the coupon from a vendor that offers the product for purchase. Alternatively, control circuitry 304 may receive the coupon from an account associated with the user. For example, control circuitry 304 may receive the coupon from a t-commerce account for the user. The user may send the coupon from their e-mail account to the t-commerce account. Alternatively, the user may direct a vendor to send the coupon directly to the user's t-commerce account. In some embodiments, control circuitry 304 automatically retrieves a coupon for a particular vendor from the user's t-commerce account and applies the coupon to the purchase price of a product offered by the vendor. This may allow the user to avoid the hassle of searching for the coupon and applying it when purchasing the product from the vendor.

In some embodiments, control circuitry 304 determines whether a product in the list is associated with a coupon and/or a preferred vendor. Control circuitry 304 visually distinguishes the product from other products in the list in response to determining that the product is associated with a coupon and/or a preferred vendor. In some embodiments, control circuitry 304 retrieves from a memory a profile for the user. Control circuitry 304 determines that the profile includes the coupon and/or the preferred vendor. Control circuitry 304 further determines that the coupon and/or the preferred vendor included in the profile are associated with the product.

In some embodiments, the coupon is received from a vendor offering the product for purchase. In some embodiments, the coupon is received from one of an e-mail account, a t-commerce account, and a social media account for a user. In some embodiments, the coupon is received at an e-mail account for the user from a vendor offering the product for purchase and transferred to a t-commerce account for the user.

In some embodiments, control circuitry 304 generates for display an icon for the product in the list associated with a coupon and/or a preferred vendor. In some embodiments, control circuitry 304 generates for display a highlight for the product in the list associated with a coupon and/or a preferred vendor. In some embodiments, control circuitry 304 generates for display the list including the product associated with a coupon and/or a preferred vendor in a color different from one or more colors for the other products in the list. In some embodiments, control circuitry 304 generates for display the list including the product associated with at least one of a coupon and a preferred vendor above the other products in the list.

FIG. 8 is an illustrative embodiment of product data associated with a media asset in accordance with some embodiments of the disclosure. Product data 800 may be retrieved from product data source 424 or any other suitable device or location accessible via communication network 414 (FIG. 4). Product data 800 may be included in a database, kept as a separate file, or stored and/or retrieved in any other suitable manner. Product data 800 may include a plurality of fields.

In the illustrated embodiment, product data 800 includes fields 802-832. Field 802 indicates the beginning of product data associated with a media asset. Field 804 indicates the title of the media asset as THE BOURNE IDENTITY and field 806 indicates the media asset runtime as 119 MINUTES. Field 808 indicates the beginning of product data associated with the media asset. Fields 808-818 and 820-830 indicate information for two products featured in the media asset. Particularly, field 810 indicates the product category as ELECTRONIC and field 812 indicates the product as APPLE IPHONE. Field 814 indicates a timestamp, 45 MINUTES, 15 SECONDS, for when the media asset features the product. Field 816 indicates a link to purchase the product. These fields are illustrative and the product data may include one or all of these fields and/or any other suitable fields related to products featured in the media asset. Similarly, field 822 indicates the product category as AUTOMOTIVE and field 824 indicates the product as HYUNDAI SONATA. Field 826 indicates a timestamp, 54 MINUTES, 04 SECONDS, for when the media asset features the product. Field 828 indicates a link to purchase the product. These fields are illustrative and the product data may include one or all of these fields and/or any other suitable fields related to products featured in the media asset.

Fields 802-832 include package indicators, e.g., <PRODUCT DATA> and </PRODUCT DATA>, to indicate the beginning and end of information associated with product data 800. In some embodiments, control circuitry 304 (FIG. 3) may use the package indicators to determine one or more products featured with the media asset. It should be noted that the information packages described herein are illustrative only and are not limiting. Additional information packages (or fewer information packages) may be used in accordance with this disclosure.

In some embodiments, product data 800 is received by control circuitry 304 as described with reference to step 902 in FIG. 9. Product data 800 may be stored on, or retrieved from, product data source 424 or any other suitable device or location accessible via communication network 414.

Figure 9:
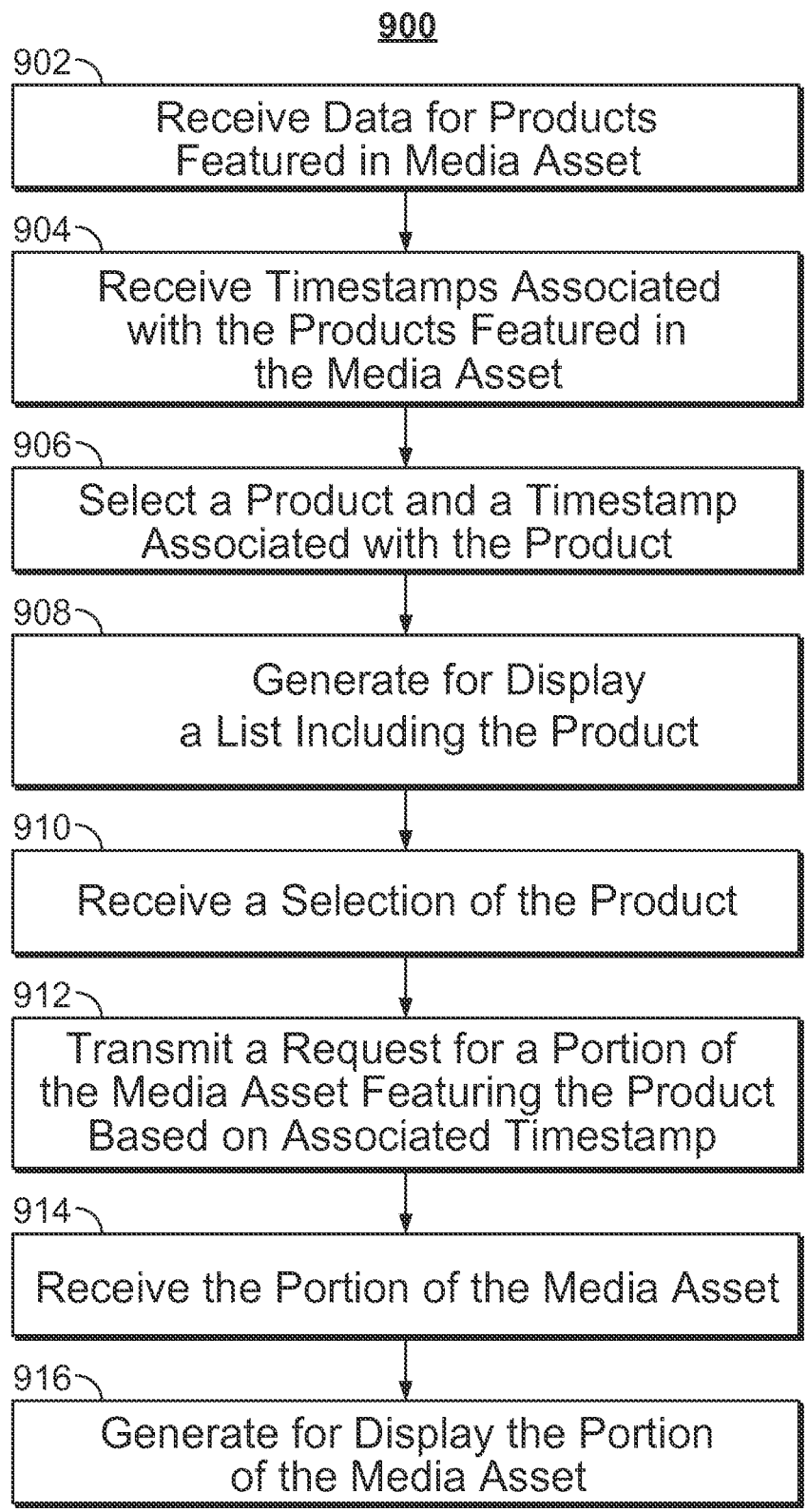
FIG. 9 is a flowchart of illustrative steps for receiving product data in accordance with some embodiments of the disclosure.

FIG. 9 is a flowchart 900 of illustrative steps for receiving product data in accordance with some embodiments of the disclosure. At step 902, control circuitry 304 receives data for products featured in a media asset. The product data may be received in accordance with the embodiments described in FIGS. 5-6. In some embodiments, the media asset includes a plot segment and an advertisement segment, where products are featured in the plot segment of the media asset. At step 904, control circuitry 304 receives timestamps associated with the products featured in the media asset. Each timestamp is associated with one of the products featured in the media asset. For example, circuitry 304 may receive product data 800 (FIG. 8) from product data source 424 (FIG. 4) to receive data for products featured in the media asset and timestamps associated with the products featured in the media asset.

Figure 10:
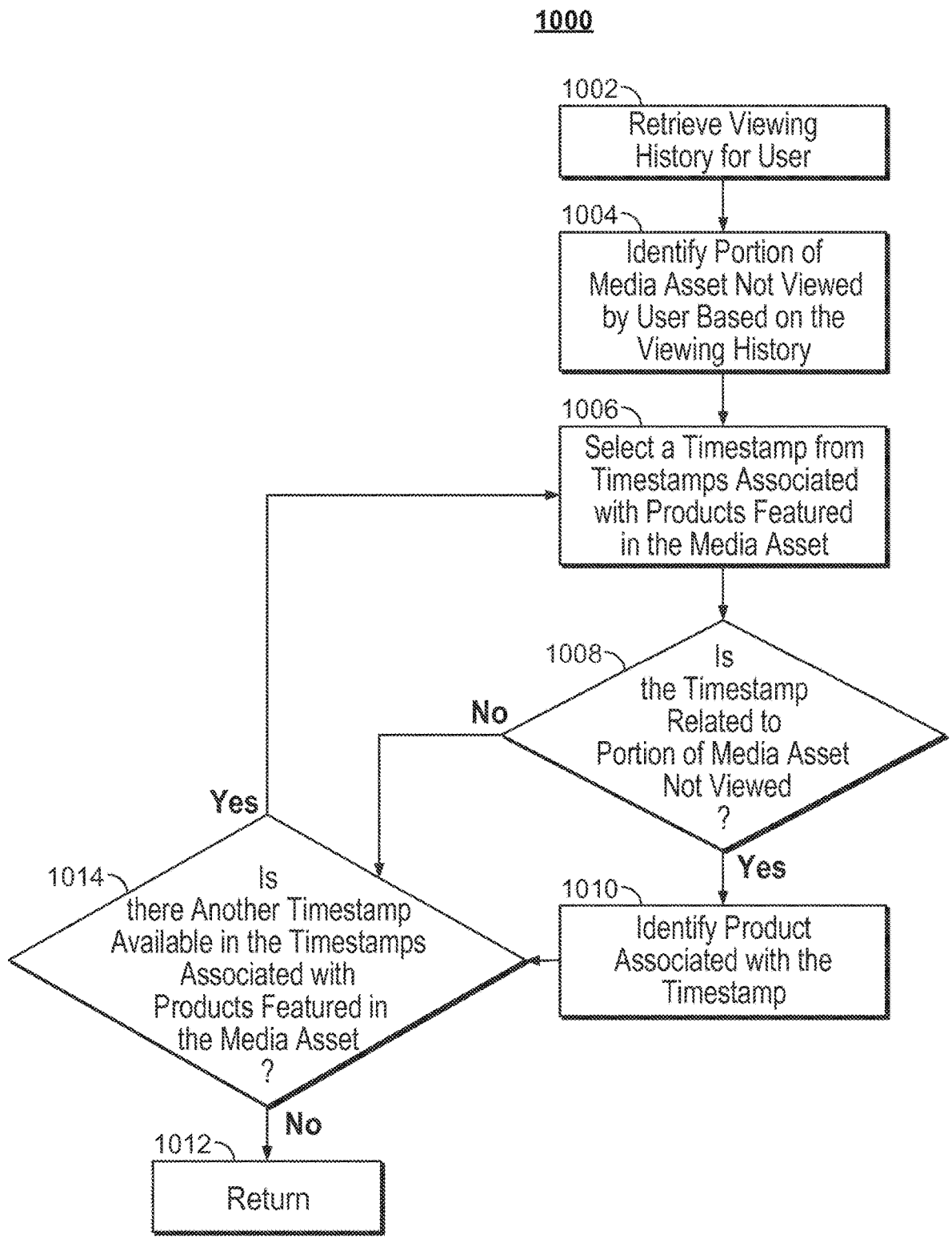
FIG. 10 is a flowchart of illustrative steps for executing step 906 of FIG. 9 in accordance with some embodiments of the disclosure.

At step 906, control circuitry 304 selects one or more products and timestamps associated with the products. In some embodiments, control circuitry 304 may select all products featured in the plot segment of the media asset. In some embodiments, control circuitry 304 may select products from a portion of the media asset not yet viewed by the user. Control circuitry 304 may retrieve from a memory a viewing history for the user. Control circuitry 304 may identify a portion of the media asset that is not viewed by the user based on the viewing history. In some embodiments, the portion of the media asset includes a portion of the plot segment of the media asset and does not include any portion of the advertisement segment of the media asset. Control circuitry 304 may determine a timestamp related to the portion of the media asset not viewed by the user and identify a product associated with the timestamp. This embodiment is further described with reference to flowchart 1000 (FIG. 10).

In some embodiments, control circuitry 304 may select products from a portion of the media asset that has been previously viewed by the user. Control circuitry 304 may retrieve from a memory a viewing history for the user. Control circuitry 304 may identify a portion of the media asset that has been viewed by the user based on the viewing history. In some embodiments, the portion of the media asset includes a portion of the plot segment of the media asset and does not include any portion of the advertisement segment of the media asset. Control circuitry 304 may determine a timestamp related to the portion of the media asset viewed by the user and identify a product associated with the timestamp. In some embodiments, the user may select a product from the list to express interest and receive subsequent advertisements and/or information for products featured in the media asset related to the product of interest to the user.

At step 908, control circuitry 304 generates for display a list including the selected products. For example, the media asset may feature products including APPLE IPHONE electronics and HYUNDAI SONATA automobiles. At step 910, control circuitry 304 receives a user selection of a product from the list via, e.g., user input interface 310. At step 912, control circuitry 304 transmits a request to a server or database, e.g., media content source 416, for a portion of the media asset featuring the product based on the timestamp associated with the product. At step 914, control circuitry 314 receives the portion of the media asset featuring the product. At step 916, control circuitry 304 generates for display the portion of the media asset featuring the selected product.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure.

FIG. 10 is a flowchart 1000 of illustrative steps for executing step 906 of FIG. 9 in accordance with some embodiments of the disclosure. At step 1002, control circuitry 304 retrieves from a memory, e.g., storage 308, a viewing history for the user. At step 1004, control circuitry 304 analyzes the viewing history for the media asset to identify one or more portions of the media asset not viewed by the user. At step 1006, control circuitry 304 selects a timestamp from timestamps associated with products featured in the media asset. At step 1008, control circuitry 304 determines if the selected timestamp is related to the portion of the media asset not viewed by the user. If the selected timestamp is related to the portion of the media asset not viewed by the user, at step 1010, control circuitry 304 identifies the product associated with the timestamp and proceeds to step 1014, described further below. If the selected timestamp is not related to the portion of the media asset not viewed by the user, at step 1014, control circuitry 304 determines if there are any remaining timestamps that are associated with products featured in the media asset. If there are timestamps remaining to be analyzed, at step 1006, control circuitry 304 selects another timestamp from timestamps associated with products featured in the media asset. If no timestamps remain to be analyzed, at step 1012, control circuitry 304 returns to step 908 in FIG. 9 with any identified products and associated timestamps.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for providing product information related to a content item, the method comprising:
   retrieving a content item to provide for consumption;
   retrieving a product data structure associated with the content item, the product data structure comprising data identifying a plurality of objects appearing in the content item, a corresponding timestamp for each of the plurality of objects, and a corresponding hyperlink for each of the plurality of objects;
   identifying, based on past purchase activity associated with a user profile, one or more preferred vendors associated with one or more of the plurality of objects;
   generating a mosaic display of the content item and a plurality of video clips each corresponding to one of the plurality of objects based on the corresponding timestamp from the product data structure, wherein a first subset of the one or more of the plurality of video clips corresponding to products associated with the one or more preferred vendors are visually distinguished from a second subset of the one or more of the plurality of video clips corresponding to products that are not associated with the one or more preferred vendors; and
   in response to receiving a user selection of a video clip of the mosaic of the plurality of video clips, generating for display the content item beginning at the timestamp for the one of the plurality of objects corresponding to the selected video clip and a user interface element with the corresponding hyperlink, from the product data structure, for the respective object of the plurality of objects.

2. The method of claim 1, wherein identifying the plurality of objects contained in the content item comprises retrieving data for the plurality of objects contained in the content item and a plurality of timestamps for the content item, each respective timestamp of the plurality of timestamps associated with a respective object of the plurality of objects.

3. The method of claim 2, wherein generating for display the content item beginning at the point where the object of the selected video clip is contained in the content item comprises generating for display the content item beginning at a timestamp of the plurality of timestamps associated with the object.

4. The method of claim 2, further comprising generating for display the data for the plurality of objects, wherein the data for the plurality of objects is at least one of product information, a category, a price, or a vendor.

5. The method of claim 2, wherein the data comprises product information for the object of the plurality of objects, further comprising:
   substituting, based on the user profile, the product information for the object with product information for a similar object to the object; and
   generating for display the product information for the similar object to the object.

6. The method of claim 1, wherein identifying the plurality of objects contained in the content item comprises:
   retrieving a viewing history associated with a user profile; and
   identifying, based on the viewing history, the plurality of objects contained in unviewed portions of the content item.

7. The method of claim 1, further comprising generating for display an option to purchase the object of the selected video clip.

8. The method of claim 1, further comprising:
   receiving a selection of a selected object category from a plurality of object categories, wherein each of the plurality of objects corresponds to one or more of the plurality of object categories; and
   determining a subset of the plurality of objects based on the selected object category, wherein the subset of the plurality of objects is featured in a plot segment of the content item, and
   wherein the plurality of video clips each corresponds to an object of the subset of the plurality of objects.

9. The method of claim 1, further comprising adding the object of the selected video clip to a user wishlist.

10. The method of claim 1, further comprising generating for display a coupon for the object of the selected video clip, wherein the coupon is retrieved from a t-commerce account corresponding to the user profile.

11. A system for providing product information related to a content item, the system comprising:
   memory; and
   a processor configured to:
      retrieve from memory a content item to provide for consumption;
      retrieve a product data structure associated with the content item, the product data structure comprising data identifying a plurality of objects appearing in the content item, a corresponding timestamp for each of the plurality of objects, and a corresponding hyperlink for each, of the plurality of objects;

identify, based on past purchase activity associated with a user profile, one or more preferred vendors associated with one or more of the plurality of objects;

generate a mosaic display of the content item and a plurality of video clips each corresponding to one of the plurality of objects based on the corresponding timestamp from the product data structure, wherein a first subset of the one or more of the plurality of video clips corresponding to products associated with the one or more preferred vendors are visually distinguished from a second subset of the one or more of the plurality of video clips corresponding to products that are not associated with the one or more preferred vendors; and in response to receiving a user selection of a video clip of the mosaic of the plurality of video clips, generate for display the content item beginning at the timestamp for the one of the plurality of objects corresponding to the selected video clip and a user interface element with the corresponding hyperlink, from the product data structure, for the respective object of the plurality of objects.

12. The system of claim 11, wherein the processor is further configured to identify the plurality of objects contained in the content item by retrieving data for the plurality of objects contained in the content item and a plurality of timestamps for the content item, each respective timestamp of the plurality of timestamps associated with a respective object of the plurality of objects.

13. The system of claim 12, wherein the processor is further configured to generate for display the content item beginning at the point where the object of the selected video clip is contained in the content item by generating for display the content item beginning at a timestamp of the plurality of timestamps associated with the object.

14. The system of claim 12, the processor is further configured to generate for display the data for the plurality of objects, wherein the data for the plurality of objects is at least one of product information, a category, a price, or a vendor.

15. The system of claim 12, wherein the data comprises product information for the object of the plurality of objects, and the processor is further configured to:

substitute, based on the user profile, the product information for the object with product information for a similar object to the object; and generate for display the product information for the similar object to the object.

16. The system of claim 11, wherein the processor is further configured to identify the plurality of objects contained in the content item by:

retrieving a viewing history associated with a user profile; and identifying, based on the viewing history, the plurality of objects contained in unviewed portions of the content item.

17. The system of claim 11, wherein the processor is further configured to generate for display an option to purchase the object of the selected video clip.

18. The system of claim 11, wherein the processor is further configured to:

receive a selection of a selected object category from a plurality of object categories, wherein each of the plurality of objects corresponds to one or more of the plurality of object categories; and determine a subset of the plurality of objects based on the selected object category, wherein the subset of the plurality of objects is featured in a plot segment of the content item, and wherein the plurality of video clips each corresponds to an object of the subset of the plurality of objects.

19. The system of claim 11, wherein the processor is further configured to add the object of the selected video clip to a user wishlist.

20. The system of claim 11, wherein the processor is further configured to generate for display a coupon for the object of the selected video clip, wherein the coupon is retrieved from a t-commerce account corresponding to the user profile.

* * * * *